United States Patent
Yamasaki et al.

(10) Patent No.: US 9,636,622 B2
(45) Date of Patent: May 2, 2017

(54) ACCUMULATOR

(71) Applicant: DENSO CORPORATION, Kariya, Aichi-pref. (JP)

(72) Inventors: Kurato Yamasaki, Anjo (JP); Teruyuki Hotta, Nagoya (JP); Kazuhisa Makida, Handa (JP); Hajime Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/425,292

(22) PCT Filed: Aug. 2, 2013

(86) PCT No.: PCT/JP2013/004700
§ 371 (c)(1),
(2) Date: Mar. 2, 2015

(87) PCT Pub. No.: WO2014/038127
PCT Pub. Date: Mar. 13, 2014

(65) Prior Publication Data
US 2015/0231549 A1 Aug. 20, 2015

(30) Foreign Application Priority Data
Sep. 7, 2012 (JP) .................................. 2012-197222

(51) Int. Cl.
*B01D 53/04* (2006.01)
(52) U.S. Cl.
CPC ...... *B01D 53/0407* (2013.01); *B01D 2257/80* (2013.01)
(58) Field of Classification Search
CPC .................. B01D 2257/80; B01D 53/0407
See application file for complete search history.

(56) References Cited

U.S. PATENT DOCUMENTS 4,331,001 A * 5/1982 Jones .................... F25B 43/006
62/474
4,509,340 A 4/1985 Mullally et al.
(Continued)

FOREIGN PATENT DOCUMENTS

EP     0276943 A2    8/1988
EP     2787306 A1    10/2014
(Continued)

OTHER PUBLICATIONS

International Search Report and Written Opinion (in Japanese with English Translation) for PCT/JP2013/004700, mailed Aug. 27, 2013; ISA/JP.
(Continued)

*Primary Examiner* — Christopher P Jones
(74) *Attorney, Agent, or Firm* — Harness, Dickey & Pierce, P.L.C.

(57) ABSTRACT

An accumulator has a tank and a desiccant. The tank separates refrigerant flowing to the tank into vapor-phase refrigerant and liquid-phase refrigerant, therein stores the liquid-phase refrigerant, and emits the vapor-phase refrigerant toward a suction side of a compressor. The desiccant is disposed in the tank and removing a water content from the refrigerant. Liquid-phase refrigerant included in the refrigerant flowing to the tank drops downward from a location that is located above the desiccant, and is stored in a lower portion in the tank. Vapor-phase refrigerant included in the refrigerant flowing to the tank is drawn through a suction port that is located above the desiccant to flow out of the tank. At least a part of the desiccant is exposed to vapor-phase refrigerant under a normal condition, and the desiccant is located at a location that is away from a dropping route of liquid-phase refrigerant in the tank.

9 Claims, 7 Drawing Sheets

(56) References Cited

U.S. PATENT DOCUMENTS

| | | | |
|---|---|---|---|
| 4,768,355 A | | 9/1988 | Breuhan et al. |
| 5,282,370 A | * | 2/1994 | Kiblawi ................ F25B 43/006 138/44 |
| 5,814,136 A | * | 9/1998 | Wood ................. B01D 53/0415 210/282 |
| 6,148,632 A | | 11/2000 | Kishita et al. |
| 6,196,019 B1 | | 3/2001 | Higo et al. |
| 6,389,842 B1 | | 5/2002 | Telesz et al. |
| 6,481,241 B1 | * | 11/2002 | Fisk ................... B01D 53/0415 62/475 |

FOREIGN PATENT DOCUMENTS

| | | |
|---|---|---|
| JP | H11278045 A | 10/1999 |
| JP | 2001082814 A | 3/2001 |
| JP | 2007232335 A | 9/2007 |
| JP | 2008304097 A | 12/2008 |
| JP | 2009180469 A | 8/2009 |

OTHER PUBLICATIONS

Office Action mailed Apr. 28, 2015 in the corresponding JP application No. 2012-197222. (with English translation).
Office Action dated Dec. 11, 2015 issued in the corresponding CN application No. 201380046352.4 in Chinese with English translation.

\* cited by examiner

ACCUMULATOR

CROSS REFERENCE TO RELATED APPLICATIONS

This application is a U.S. National Phase Application under 35 U.S.C. 371 of International Application No. PCT/JP2013/004700 filed on Aug. 2, 2013 and published in Japanese as WO 2014/038127 A1 on Mar. 13, 2014. This application is based on and claims the benefit of priority from Japanese Patent Application No. 2012-197222 filed on Sep. 7, 2012. The entire disclosures of all of the above applications are incorporated herein by reference.

TECHNICAL FIELD

The present disclosure relates to an accumulator for a refrigerant cycle.

BACKGROUND OF ART

An accumulator separates refrigerant into vapor-phase refrigerant and liquid-phase refrigerant and supplies the vapor-phase refrigerant to a compressor constituting a refrigerant cycle. The accumulator has a tank separating refrigerant that flows to the accumulator into vapor-phase refrigerant and liquid-phase refrigerant and therein storing the liquid-phase refrigerant. In the accumulator, as disclosed in Patent Documents 1 and 2, a desiccant is disposed in the tank to remove a water content from the refrigerant.

In the accumulator of Patent Document 1, the desiccant is located on a lower side in the tank, and the desiccant is entirely soaked in liquid-phase refrigerant.

In the accumulator of Patent Document 2, the desiccant is located above a highest liquid level of liquid-phase refrigerant such that the desiccant is not entirely soaked in liquid-phase refrigerant. In the accumulator, the desiccant is located at all area of the tank in cross section. The desiccant is located directly below a refrigerant inlet for vapor-liquid mixed refrigerant. Furthermore, a suction port for vapor-phase refrigerant is located above the desiccant.

PRIOR ART DOCUMENT

Patent Document

Patent Document 1: JP-2001-082814 A
Patent Document 2: JP-2009-180469 A

SUMMARY OF INVENTION

From studies conducted by inventors of the present disclosure, it was found that there is a possibility of causing an unusual noise in a startup of a compressor constituting a refrigerant cycle in a case where the desiccant is entirely soaked in liquid-phase refrigerant as described in Patent Document 1. The reason is that a sudden refrigerant boiling that begins at the desiccant is caused due to a decompression inside the tank in a startup of the compressor, and the tank vibrates since a pressure is caused in the tank due to the sudden refrigerant boiling.

On the other hand, there is no possibility of causing the above unusual noise in the startup of the compressor in a case where the desiccant is not entirely soaked in liquid-phase refrigerant as described in Patent Document 2. However, in such a case, since the desiccant is located in the dropping route of liquid-phase refrigerant flowing to the tank, liquid-phase refrigerant dropping in the tank may collide with the desiccant and bounce off. The liquid-phase refrigerant bouncing off may be drawn through the suction port for vapor-phase refrigerant, and the compressor may draw the liquid-phase refrigerant.

The present disclosure has been made in view of foregoing points, and it is an object of the present disclosure to provide an accumulator with which both of an unusual noise caused in a startup of a compressor and an inflow of liquid-phase refrigerant through a suction port for vapor-phase refrigerant, due to collision of liquid-phase refrigerant with a desiccant, can be restricted.

To achieve the above object, an accumulator of the present disclosure has a tank and a desiccant. The tank separates refrigerant flowing to the tank into vapor-phase refrigerant and liquid-phase refrigerant, therein stores the liquid-phase refrigerant, and emits the vapor-phase refrigerant toward a suction side of a compressor. The desiccant is disposed in the tank and removing a water content from the refrigerant. Liquid-phase refrigerant included in the refrigerant flowing to the tank drops downward from a location that is located above the desiccant, and is stored in a lower portion in the tank. Vapor-phase refrigerant included in the refrigerant flowing to the tank is drawn through a suction port that is located above the desiccant to flow out of the tank. At least a part of the desiccant is exposed to vapor-phase refrigerant under a normal condition, and the desiccant is located at a location that is away from a dropping route of liquid-phase refrigerant in the tank.

The inventors of the present disclosure studied remedies for the unusual noise in the startup of the compressor. From the studies, the inventors found that a cause of a vibration of tank in the startup of the compressor can be restricted, and a cause of the unusual noise can be restricted, by disposing the desiccant to be partially exposed outside of liquid-phase refrigerant and located inside of the vapor-phase refrigerant, not to be entirely soaked in liquid-phase refrigerant, in the startup of the compressor. Moreover, by disposing the desiccant not to be entirely soaked in liquid-phase refrigerant, a sudden refrigerant boiling that begins at the desiccant is not caused, and the cause of the unusual noise in the startup of the compressor can be restricted.

Therefore, according to the present disclosure, since the desiccant is not soaked partially or entirely in liquid-phase refrigerant in the startup of the compressor, the cause of the unusual noise in the startup of the compressor can be restricted.

Furthermore, according to the present disclosure, since the desiccant is located at a location that is away from the dropping route of liquid-phase refrigerant in the tank, liquid-phase refrigerant dropping in the dropping route can be prevented from colliding with the desiccant, and the inflow of liquid-phase refrigerant through the suction port for vapor-phase refrigerant can be restricted.

DESCRIPTION OF EMBODIMENTS

Embodiments of the present disclosure will be described hereafter referring to drawings. In the embodiments, a part that corresponds to a matter described in a preceding embodiment may be assigned with the same reference number.

First Embodiment

Figure 1:
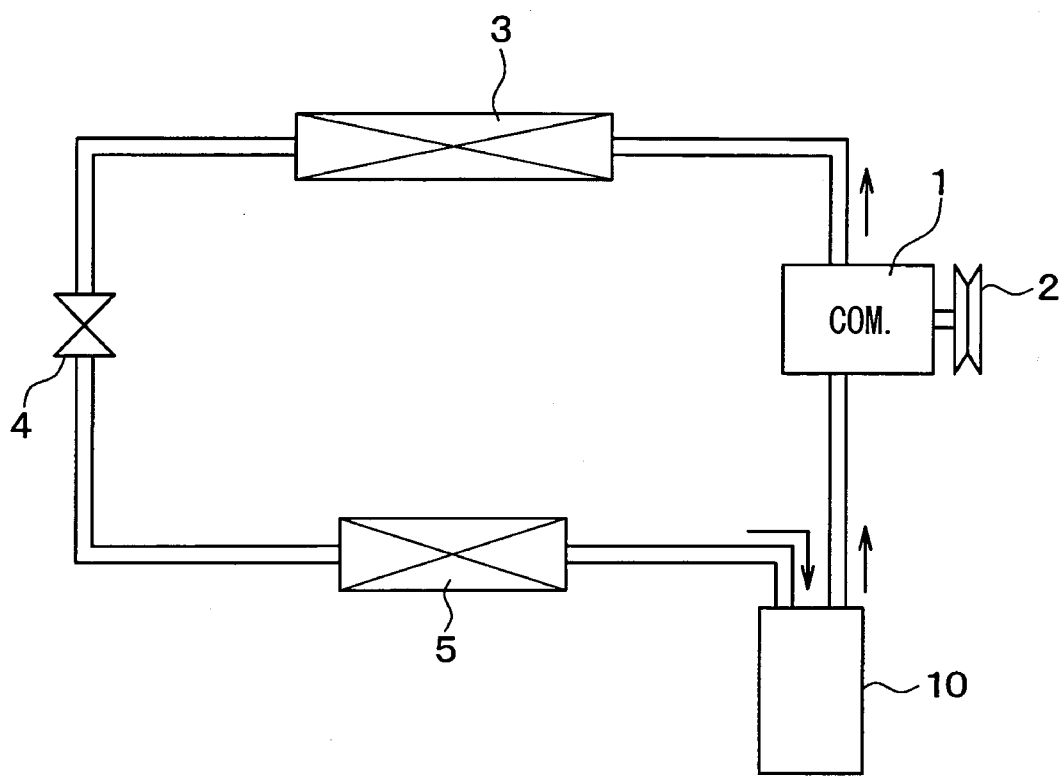
FIG. 1 is a diagram illustrating a refrigerant cycle using an accumulator according to a first embodiment.

An accumulator of the present embodiment is used in a refrigerant cycle for a vehicle air conditioner. As shown in FIG. 1, the refrigerant cycle has a compressor 1, a condenser 3, a decompressor 4, an evaporator 5, and the accumulator 10.

The compressor 1 draws and compresses refrigerant. The compressor 1 is rotatively driven by an engine (not shown) through a pulley 2, a belt, or the like for traveling a vehicle.

A variable capacity compressor of which refrigerant discharge performance can be adjusted based on a variation of a discharge capacity or a fixed capacity compressor of which refrigerant discharge performance is adjusted by changing an operation rate of the fixed capacity compressor due to on-off of an electromagnetic clutch may be used as the compressor 1. When an electric compressor is used as the compressor 1, a refrigerant discharge performance can be adjusted by adjusting a rotation speed of an electric motor.

A vapor-phase refrigerant having a high pressure that is discharged from the compressor 1 flows into the condenser 3. The vapor-phase refrigerant is cooled and condensed by exchanging heat with outside air in the condenser 3. Subsequently, a liquid-phase refrigerant condensed in the condenser 3 is decompressed to have a low pressure in the decompressor 4 and turned into a vapor-liquid mixed mist. An orifice, a fixed throttle such as a nozzle, or an appropriate variable throttle configures the decompressor 4.

Refrigerant having a low pressure after being decompressed is evaporated by absorbing heat from air that is blown by an un-shown blower for air conditioning. The evaporator 5 is disposed in an un-shown air conditioning case, and a cool air cooled in the evaporator 5 is blown into a passenger compartment after a temperature of the cool air is adjusted in an un-shown heater core part, as well known. Refrigerant passing through the evaporator 5 is drawn by the compressor 1 after being separated into vapor-phase refrigerant and liquid-phase refrigerant in the accumulator 10.

The accumulator 10 exerts a roll to separate refrigerant flowing from the evaporator 5 into vapor-phase refrigerant and liquid-phase refrigerant, store the liquid-phase refrigerant, and supply the vapor-phase refrigerant to be drawn by the compressor 1. The accumulator 10 also exerts a roll to supply oil that is merged with liquid-phase refrigerant stored at a bottom side in a tank to be drawn by the compressor 1.

Figure 2:
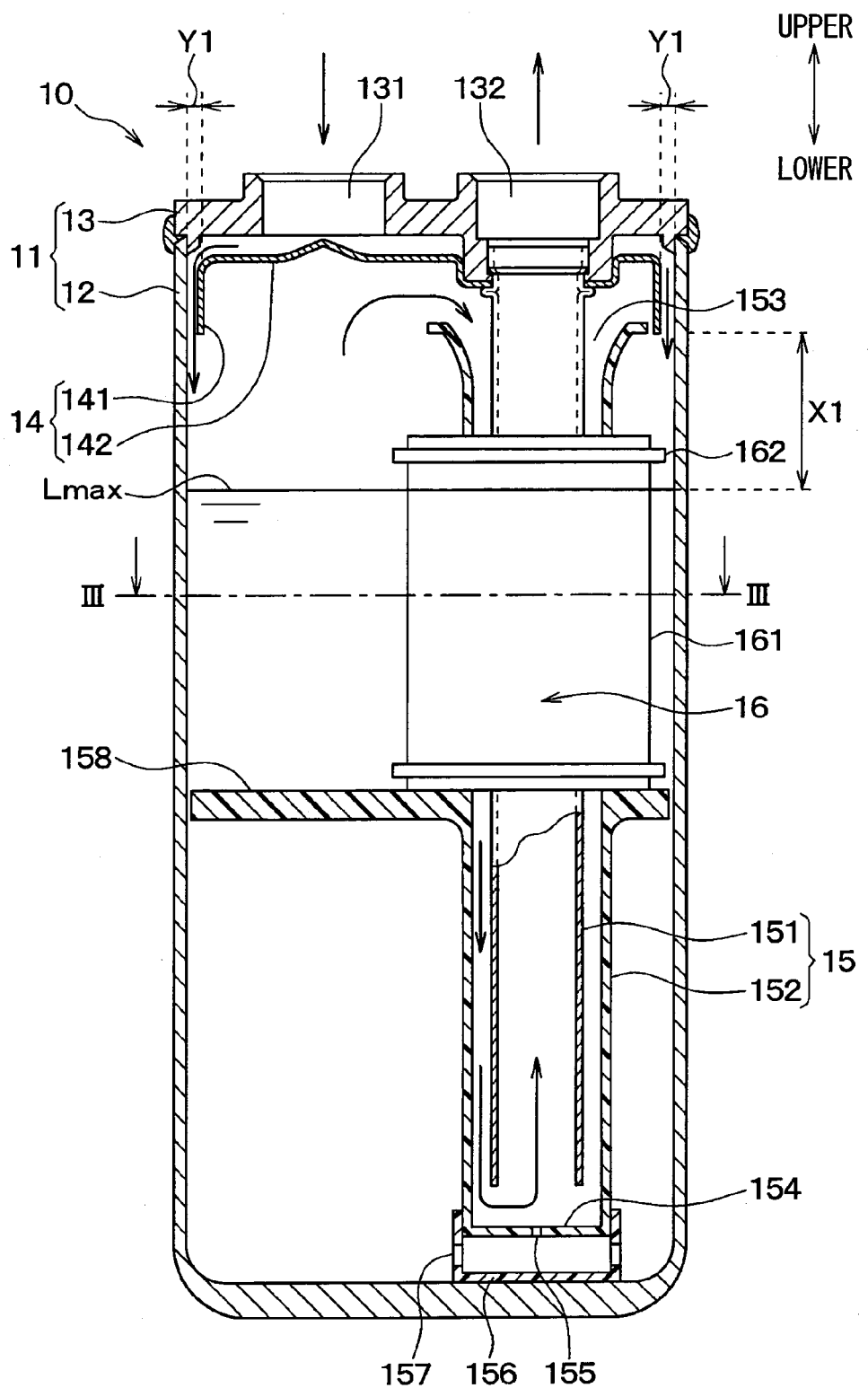
FIG. 2 is a longitudinal section view illustrating the accumulator according to the first embodiment.

As shown in FIG. 2, the accumulator 10 has a tank 11 a tank 11 separating refrigerant flowing to the tank into vapor-phase refrigerant and liquid-phase refrigerant. The tank 11 therein stores the liquid-phase refrigerant and emits the vapor-phase refrigerant toward a suction side of a compressor. An arrow showing an upper-lower direction in FIG. 2 shows a vertical direction with the accumulator 10 that is under a condition of being disposed in the vehicle.

The tank 11 is provided with a tank body 12 and a header 13 sealing an upper end portion of the tank body 12. The tank body 12 and the header 13 is made of metal, and the upper end portion of the tank body 12 and the header 13 are fixed to each other by brazing.

The tank body 12 has a bottomed cylindrical shape in which the upper end portion is open. The tank body 12 therein houses a chuting member 14, a suction pipe 15, and a desiccant 16. A separated liquid-phase refrigerant is stored in a lower portion in the tank body 12, and a lubricating oil is stored in the lower portion in the tank body 12 in a state of merging with the liquid-phase refrigerant.

The header 13 is formed in a flat tubular shape of which diameter is the same as a diameter of the tank body 12. The header 13 has a refrigerant inlet 131 and a refrigerant outlet 132 opening in the upper-lower direction and having a circular shape. The refrigerant inlet 131 communicates with the evaporator 5 through a pipe such that refrigerant after exchanging heat in the evaporator 5 can flow into the tank body 12. The refrigerant outlet 132 communicates with the compressor 1 through a pipe such that vapor-phase refrigerant after being separated in the tank body 12 can outflow toward the compressor 1.

The chuting member 14 is a colliding member with which refrigerant introduced from the refrigerant inlet 131 to flow downward in a vertical direction collides. The chuting member 14 has a sidewall 141 that extends in the upper-lower direction and has a cylindrical shape and an upper wall 142 that seals an upper end side of the sidewall 141. A lower end side of the sidewall 141 is open.

The chuting member 14 is disposed on an upper area in the tank 11 such that the upper wall 142 is visible when viewing the tank body 12 from the refrigerant inlet 131. A portion of the upper wall 142 that faces the refrigerant inlet 131 protrudes upward, and a portion of the upper wall 142 that faces the refrigerant outlet 132 is provided with an opening. The chuting member 13 is made of metal and press-fitted to a bottom surface of the header 13 in a state that the opening provided at the upper wall 142 coincides with the refrigerant outlet 132. An outer periphery of the upper wall 142 is located close to an inner wall of the tank body 12.

The accumulator 10 of the present embodiment is a collision type accumulator in which refrigerant introduced from the refrigerant inlet 131 is separated into liquid-phase refrigerant and vapor-phase refrigerant after colliding with the chuting member 14. That is, refrigerant colliding with the upper wall 142 of the chuting member 14 spreads in a lateral direction of the tank 11, and then, the refrigerant is introduced to an outer side of the outer periphery of the chuting member 14 in the lateral direction of the tank 11. The liquid-phase refrigerant drops from the outer side of the outer periphery of the chuting member 14, flows along the inner wall of the tank body 12, and is accumulated in a lower area in the tank body 12. The vapor-phase refrigerant is drawn into the suction pipe 15 from a lower side of the chuting member 14 and flows out of the tank 11.

According to the present embodiment, the suction pipe 15 is a double pipe type and has an inner pipe 151 and an outer pipe 152. Both of the inner pipe 151 and the outer pipe 152 are made of a straight pipe and housed in the tank body 12 in an upright position. The inner pipe 151 is located in the outer pipe 152 such that the inner pipe 151 and the outer pipe 152 are coaxial with each other.

The inner pipe 151 is fixed to the bottom surface of the header 13. Specifically, the inner pipe 151 is made of metal and press-fitted to the bottom surface of the header 13 in a state that an opening of an upper end portion of the inner pipe 151 coincides with the refrigerant outlet 132.

The outer pipe 152 is fixed to the inner pipe 151. Specifically, the outer pipe 152 is made of plastic, and an inner wall of the outer pipe is provided with an un-shown protruding portion (i.e., a thick portion). The outer pipe 152 is press-fitted by inserting the inner pipe 151 to an inside of the protruding portion.

The outer pipe 152 is in a state that an upper end opening 153 providing a suction port for vapor-phase refrigerant is located inside of the chuting member 14, and the chuting member 14 and the upper wall 142 are a specified distance away from each other.

In the outer pipe 152, a lower end portion 154 is sealed, and an oil return hole 155 is formed at a bottom of the lower end portion 154. The oil return hole 155 draws the lubricating oil stored in the lower area in the tank body 12 due to vapor-phase refrigerant flowing to the inner pipe 151 such that the lubricating oil passes through the inner pipe 151 with the vapor-phase refrigerant.

A filter cap 156 is attached to an outside of the lower end portion 154 of the outer pipe 152. The filter cap 156 is formed in a bottomed cylindrical shape, and a filter 157 removing a sludge or the like included in the oil is disposed on a cylindrical sidewall of the filter cap 156.

Figure 3:
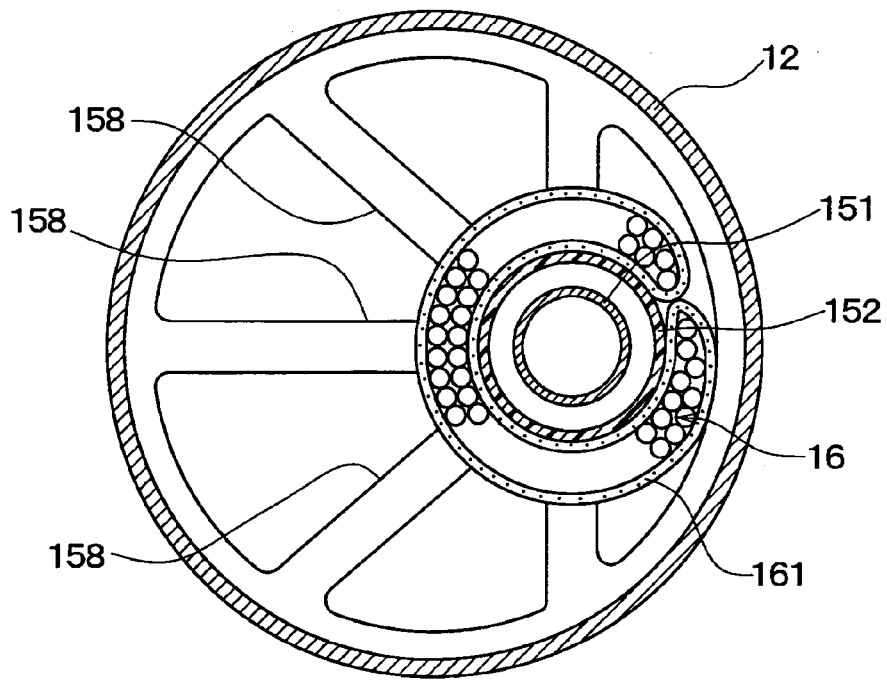
FIG. 3 is a cross-section view along a line III-Ill in FIG. 2.

A retainer 158 supporting the desiccant 16 is located close to a center of the outer pipe 152 in the upper-lower direction. The retainer 158 is made of plastic and formed integrally with the outer pipe 152. As shown in FIG. 3, the retainer 158 is formed in a shape having beams that extend from the outer pipe 152 in the lateral direction of the tank. The retainer 158 may be provided separately from the outer pipe 152.

The desiccant 16 removes a water content from refrigerant. As shown in FIG. 3, the desiccant 16 is a particle such as zeolite and used in a state of being housed in a sack 161. The sack 161 is a desiccant case that is made of fabric such as felt, has flexibility, and works as a filter.

The sack 161 in which the desiccant 16 is housed is fixed in a manner that the sack 161 is tied by a fixing part 162 formed in a band shape such as a banding band, in a state of being wound around the suction pipe 15.

In such a state, the desiccant 16 is located on an inner side of the outer periphery of the chuting member 14 in the lateral direction of the tank 11 and not located on an outer side of the outer periphery of the chuting member 14. In other words, the desiccant 16 is located in an area that is directly below the chuting member 14 and at a location that is longer than or equal to a specified distance away from the inner wall of the tank 11. The specified distance is a distance Y1 between the chuting member 14 and the inner wall of the tank 11.

The desiccant 16 is disposed such that an upper end of the desiccant 16 is located below the suction port 153 of the outer pipe 152 not to interfere the suction port 153. The upper end of the desiccant 16 is located above a liquid level (i.e., a highest liquid level) Lmax that is a liquid level when a largest amount of liquid-phase refrigerant is stored in the tank 11. That is, a part of the desiccant 16 is constantly is exposed to vapor-phase refrigerant.

The highest liquid level mentioned here is a highest liquid level under a condition that the compressor 1 is stopped. The highest liquid level is determined based on a sealed-in amount of refrigerant sealed in a whole of the refrigerant cycle. Although the sealed-in amount of refrigerant increases due to a size of the refrigerant cycle, a maximum sealed-in amount is about 1,000 g in practical use, and a liquid level is determined to be about 150 mm in the tank 11 that is used in the studies conducted by the inventors of the present disclosure. Therefore, in this case, the desiccant 16 is disposed such that the upper end of the desiccant 16 is located between the suction port 153 and a location of which height from a bottom surface of the tank 11 is 150 mm.

In the accumulator 10 having the above structure, refrigerant flowing out of the evaporator 5 flows into the tank body 12 through the refrigerant inlet 131. Refrigerant flowing to the tank body 12 is separated into liquid-phase refrigerant and vapor-phase refrigerant by being guided to the inner wall of the tank body 12 due to the chuting member 14. The separated liquid-phase refrigerant congregates in the lower area in the tank body 12, and vapor-phase refrigerant flows out of the outer pipe 152 toward the compressor 1 through the inner pipe 151.

When the vapor-phase refrigerant flows out of the outer pipe 152 and flows into the inner pipe 151, the lubricating oil stored in the lower area in the tank 12 is drawn through the filter 157 and the oil return hole 155 and outflows with the vapor-phase refrigerant from the refrigerant outlet 132 toward the compressor 1 through the inner pipe 151.

In the following portion, effects of the present embodiment will be described.

(1) In the present embodiment, the desiccant 16 is disposed such that a part of the desiccant 16 is located above the highest liquid level Lmax that is determined under the condition that the compressor 1 is stopped. Thus, according to the present embodiment, a cause of a vibration of the tank 11 in a startup of the compressor 1 can be restricted, and a cause of an unusual noise can be restricted, as shown in experimental results of FIG. 4.

Figure 4:
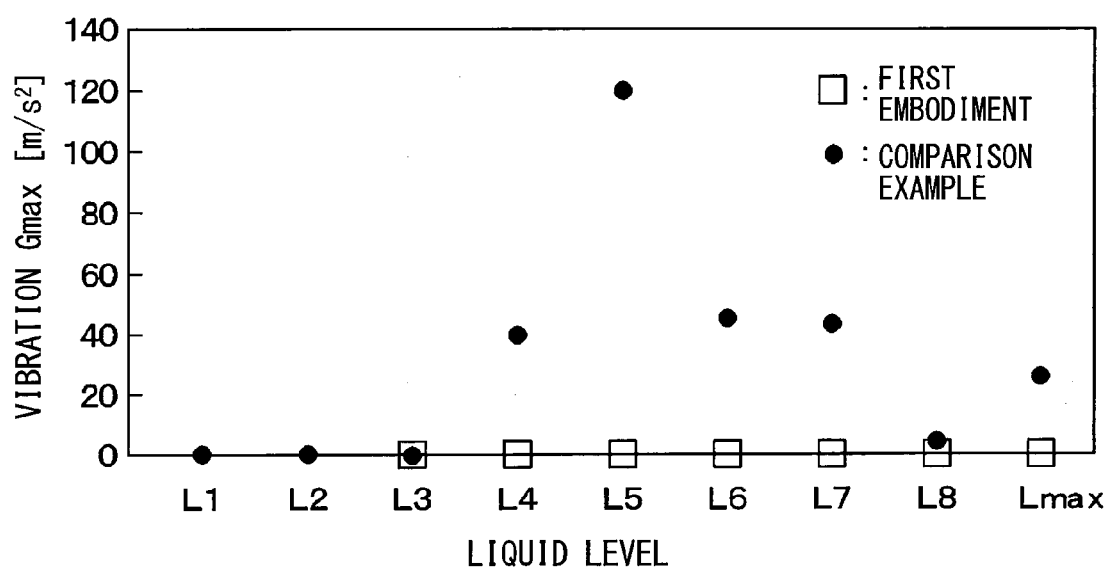
FIG. 4 shows vibration measurement results of the accumulator of the first embodiment and a comparison example.

The experimental results of FIG. 4 are experimental results regarding the accumulator 10 of the present embodiment and a comparison example. The experimental results are results of measurement of the vibration of the tank 11 in the startup of the compressor 11 while varying the liquid level in the tank 11 under the condition that the compressor 1 is stopped by changing the sealed-in amount of refrigerant sealed in the refrigerant cycle. An operation condition of the refrigerant cycle is fixed. A vertical axis in FIG. 4 shows the vibration of the tank. A horizontal axis in FIG. 4 shows the liquid level in the tank 11, and the liquid level increases as shifting rightward from L1 through Lmax in FIG. 4. Lmax is the highest liquid level.

Figure 5:
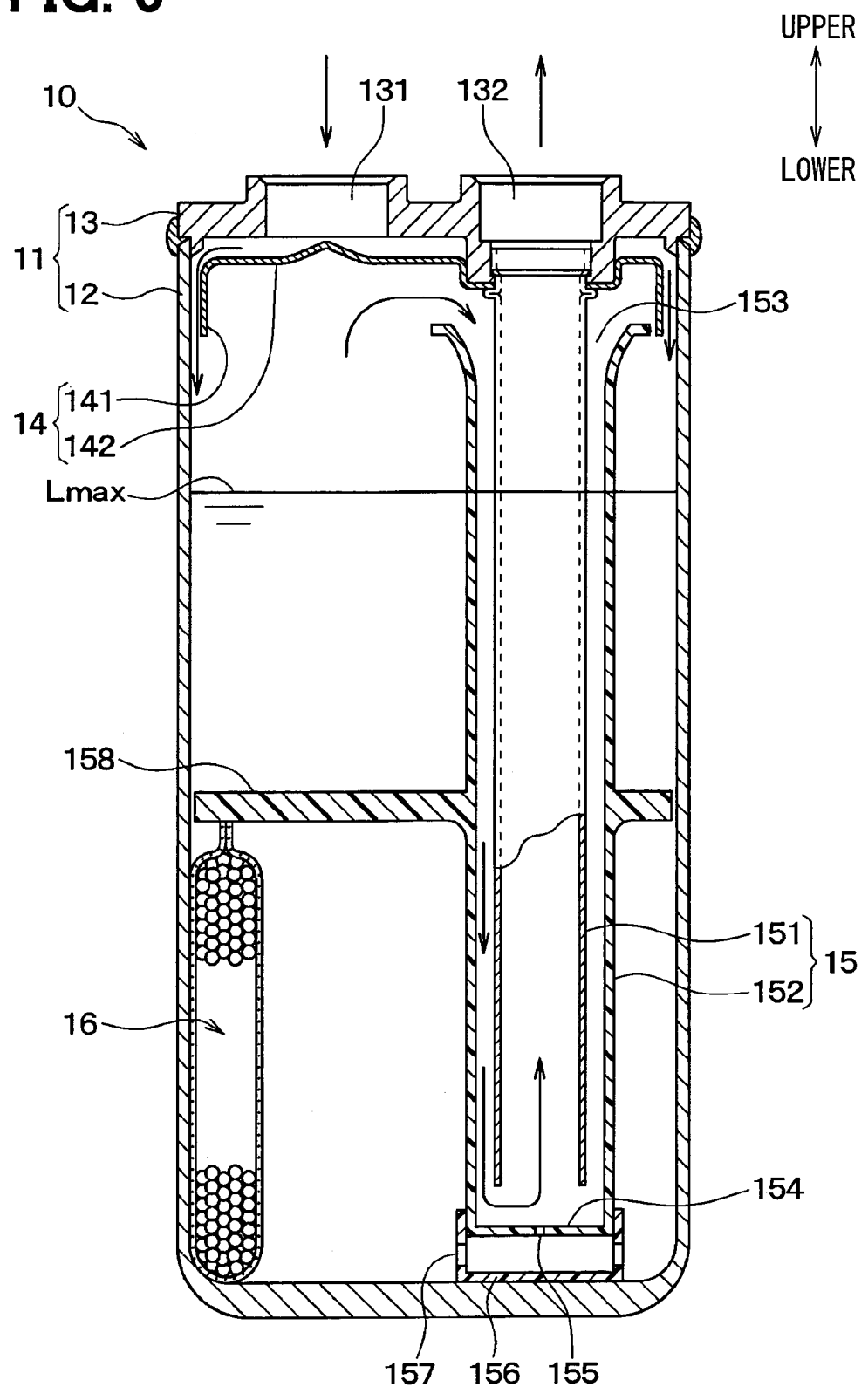
FIG. 5 is a longitudinal section view illustrating the accumulator of the comparison example.

As shown in FIG. 5, in the accumulator of the comparison example, the desiccant 16 is located in a lower area in the tank 11.

As shown in FIG. 4, in the comparison example, when the liquid level was between L1 through L3, a part of the desiccant was located outside of the liquid-phase refrigerant, and the vibration was not caused. However, when the liquid level was between L4 through Lmax, the desiccant was entirely soaked in liquid-phase refrigerant, and the vibration was caused.

On the other hand, according to the present embodiment, the desiccant was entirely soaked in liquid-phase refrigerant when the liquid level is at L3, a part of the desiccant was located outside of liquid-phase refrigerant when the liquid level was between L4 through Lmax, and the vibration was not caused at any liquid level.

(2) In the present embodiment, the desiccant 16 is located at a location that is at least a specified distance away from the inner wall of the tank 11. That is, the desiccant 16 is located at a location that is away from a dropping route along which liquid-phase refrigerant drops from the outer side of the outer periphery of the chuting member 14.

Therefore, liquid-phase refrigerant dropping from the outer side of the outer periphery of the chuting member 14 is prevented from colliding with the desiccant 16, and liquid-phase refrigerant can be prevented from being drawn through the suction port 153 of the outer pipe 152.

(3) According to the present embodiment, the desiccant 16 is housed in the sack 161 and fixed by the fixing part 162 in a state that the sack 161 is wound around the suction pipe 15.

Therefore, similar to the above comparison example, when the present disclosure is used in a conventional accumulator in which the sack 161 housing the desiccant 16 is located in the lower area in the tank 11, only a location and a fixing method of the sack 161 are required to be changed, and a design change of components of the accumulator is unnecessary.

Furthermore, when the present disclosure is used in a conventional accumulator in which the desiccant 16 is housed in a container except for the sack 161, a design change of components of the accumulator is unnecessary except for using the sack 161.

Second Embodiment

In the present embodiment, a case for the desiccant 16 is changed as compared to the first embodiment, and other constitutions are the same as that of the first embodiment.

Figure 6:
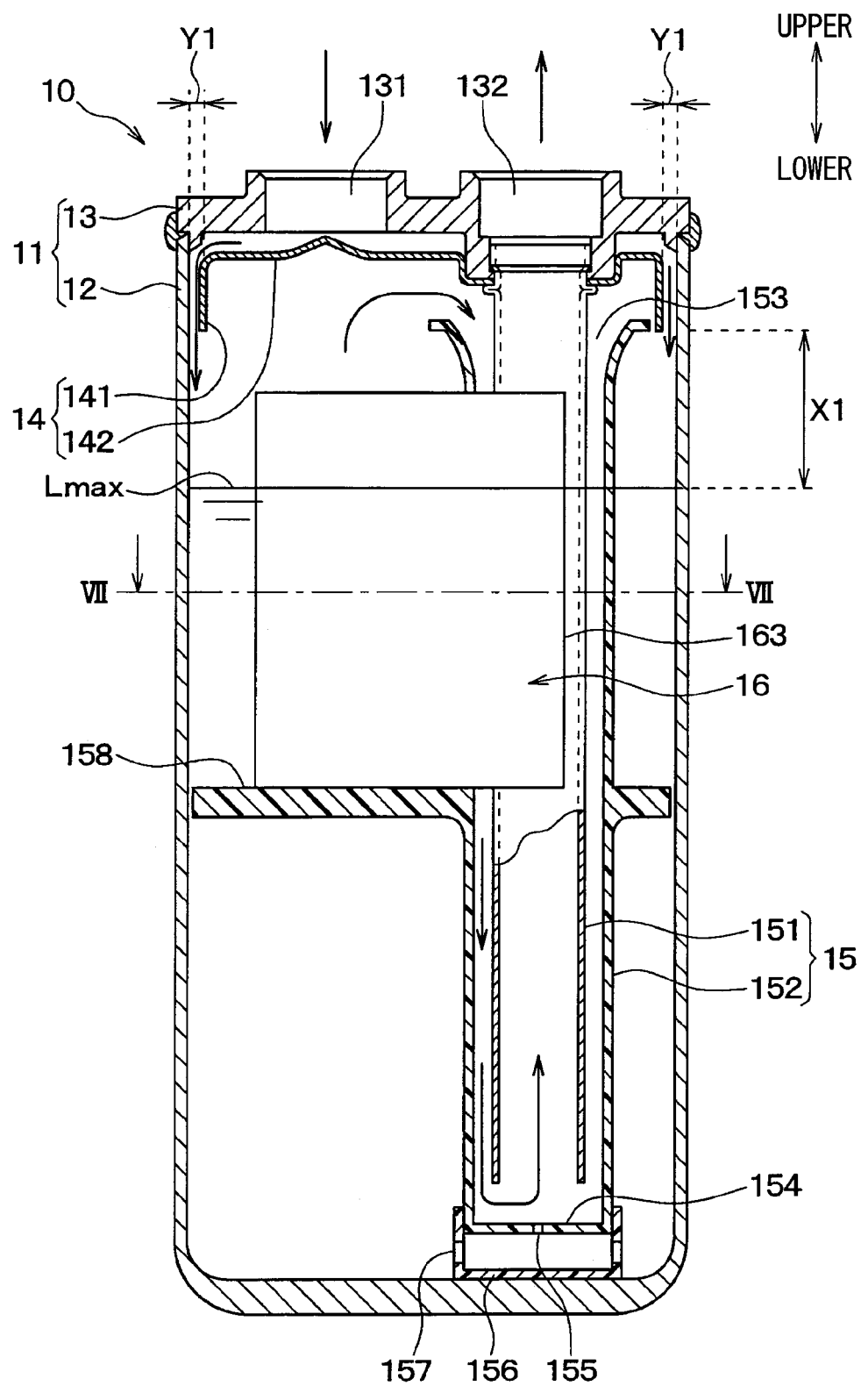
FIG. 6 is a longitudinal section view illustrating an accumulator according to a second embodiment.
Figure 7:
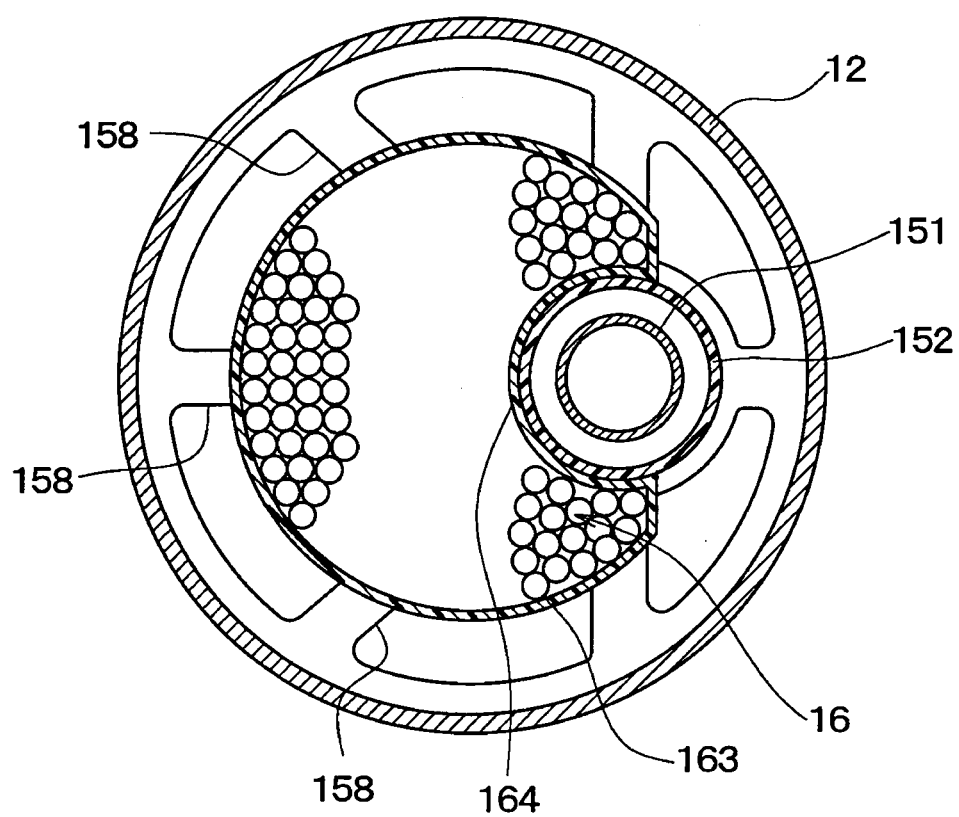
FIG. 7 is a cross-section view along a line VII-VII in FIG. 6.
Figure 8:
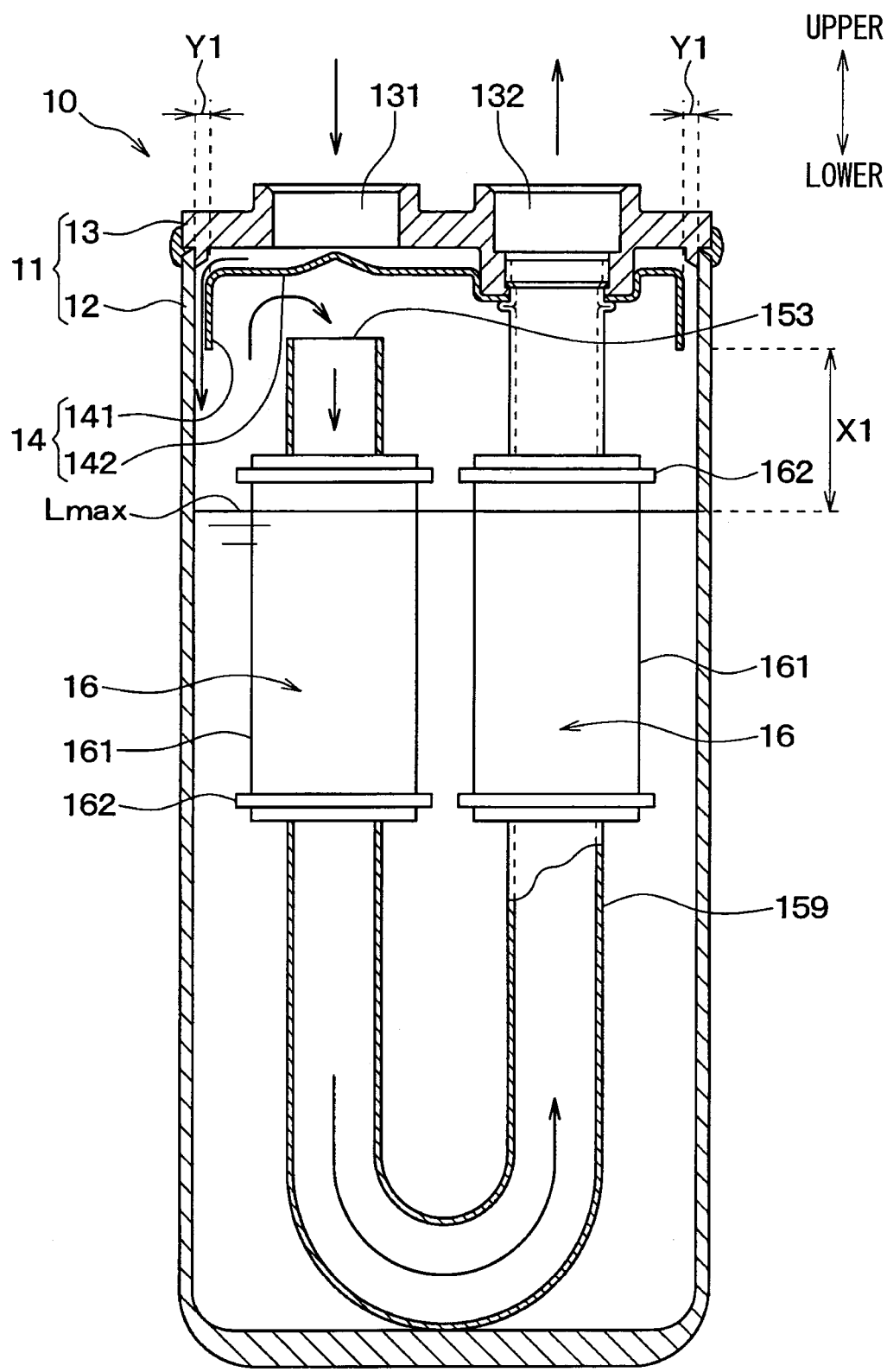
FIG. 8 is a longitudinal section view illustrating an accumulator according to a third embodiment.

As shown in FIGS. 6 and 7, the desiccant 16 is filled in a case 163 made of plastic and fixed to the outer pipe 152 at a lower part that is below the suction port 153.

The case 163 is located at a location that is at least the specified distance away from the inner wall of the tank 11, similar to the first embodiment. That is, the case 163 is located at a location that is away from the dropping route along which refrigerant drops from the outer side of the outer periphery of the chuting member 14.

As shown in FIG. 7, the case 163 has a cross sectional shape that occupies most part of a cross section of the tank 11 as being away from a nearby area of the inner wall of the tank in which liquid-phase refrigerant drops. By forming the case 163 in the above shape, a volume of the case can increase, and a using amount of the desiccant 16 can increase.

Here, in a case that a desiccant case has flexibility, the desiccant case is deformed due to a weight of the desiccant, and a bias of the desiccant causes.

Then, the case 163 of the present embodiment is made of plastic and relatively hard. Accordingly, the case 163 can be kept in a specified shape. Therefore, according to the present embodiment, since the case 163 is not deformed due to the weight of the desiccant 16, the desiccant 16 filled in the case 163 can be prevented from being biased. A case made of a material except for plastic may be used as the case 163 as long as the case can be kept in a specified shape.

Moreover, as shown in FIG. 7, the case 163 has a press-fitting portion 164 formed in a shape that fits an outer peripheral surface of the suction pipe 15, and the suction pipe 15 is fixed by being press-fitted to the press-fitting portion 164. The press-fitting portion 164 has a C-shape corresponding to the suction pipe 15 in a circumference direction except for a part of the suction pipe 15. The suction pipe 15 is press-fitted to the press-fitting portion 164 by pressing the press-fitting portion 164 against the suction pipe 15 in the lateral direction.

Thus, by employing a constitution in which the case 163 made of plastic is press-fitted to the suction pipe 15, only the case 163 having the above shape is required to be further disposed, and other components, except for the case 163, consisting the accumulator can employ conventional components. Furthermore, an assembly process of the desiccant 16 to the suction pipe 15 become easier with a manner of fixing the case 163 by press-fitting as compared to with a manner of fixing the case by tying the sack 161.

Although the press-fitting portion 164 has the C-shape as described above, the press-fitting portion 164 may have an O-shape. In such a case, the case 163 is fixed to the suction pipe 15 by inserting the suction pipe 15 to the press-fitting portion 164 having the O-shape.

Third Embodiment

In the present embodiment, a suction pipe is changed as compared to the first embodiment. That is, in the present embodiment, a U-shaped pipe 159 is used as the suction pipe. The desiccant 16 is housed in the sack 161 similar to the first embodiment, and the sack 161 is fixed by the fixing part 162 in a state of being wound around the U-shaped pipe 159. Thus, the present disclosure can be used in a case using the U-shaped pipe 159 as the suction pipe.

The case 163 made of plastic may be used as the case of the desiccant 16 similar to the second embodiment.

Other Modification

The present disclosure is not limited to the above embodiments, and the embodiments can be modified as needed within a scope of the present disclosure.

(1) In the first embodiment, the fixing part 162 having band like shape is wound all around the sack 161 in a circumference direction of the sack 161 in a state that the sack 161 housing the desiccant 16 is wound around the suction pipe 15. However, the sack 161 may be fixed by another fixing part. For example, the sack 161 may be fixed to the suction pipe 15 in a manner that end portions of the sack 161 wound around the suction pipe 15 are seamed to each other or that a ring-shaped fixing part is inserted to an opening provided at an end portion of the sack 161.

(2) Although the case 163 for the desiccant 16 is press-fitted to the suction pipe 15 in the second embodiment, the case 163 may be fixed by another method except for press-fitting. For example, the case 163 for the desiccant 16 are formed integrally with the outer pipe 152 of the suction pipe 15. In this case, a cap of the case 163 is formed separately.

(3) The case 163 for the desiccant 16 has the shape shown in FIGS. 6 and 7 in the second embodiment. However, the case 163 may have another shape as long as the desiccant 16 is located on the inner side of the outer periphery of the chuting member 14 in the lateral direction of the tank 11.

(4) Although the chuting member 14 has the shape shown in FIG. 2 in the above embodiments, the chuting member 14 may be varied to have another shape.

(5) In the above embodiments, the chuting member 14 may be omitted. In this case, since liquid-phase refrigerant drops from the refrigerant inlet 131, the refrigerant inlet 131 becomes a starting position from which the liquid-phase refrigerant drops. Then, in this case, the desiccant 16 may be located avoiding a location that is directly below the refrigerant inlet 131.

(6) In the above embodiments, a part of the desiccant 16 is located above the highest liquid level Lmax that is determined under the condition that the compressor 1 is stopped. However, a whole of the desiccant 16 may be located above the highest liquid level Lmax.

It should be understood that components consisting the above embodiments are not necessary except for a case that the components are explicitly mentioned to be necessary or a case that the components are considered to be explicitly necessary in principle. Furthermore, the above embodiments are not irrelevant to each other and can be combined as needed except for a case that a combination is explicitly unacceptable.

What is claimed is:

1. An accumulator comprising:
   a tank separating refrigerant flowing to the tank into vapor-phase refrigerant and liquid-phase refrigerant, the tank therein storing the liquid-phase refrigerant and emitting the vapor-phase refrigerant toward a suction side of a compressor; and
   a desiccant disposed in the tank and removing a water content from the refrigerant, wherein
   liquid-phase refrigerant included in the refrigerant flowing to the tank drops downward from a location that is located above the desiccant, and is stored in a lower portion in the tank,
   vapor-phase refrigerant included in the refrigerant flowing to the tank is drawn through a suction port that is located above the desiccant to flow out of the tank,
   at least a part of the desiccant is exposed to vapor-phase refrigerant under a normal condition, and the desiccant is located at a location that is away from a dropping route of liquid-phase refrigerant in the tank, and
   the desiccant has an exposed portion that is always located above a highest liquid level of the liquid-phase refrigerant stored in the tank while an operation of the compressor is stopped.

2. The accumulator according to claim 1, further comprising
   a suction pipe located in the tank and having the suction port, wherein
   the desiccant is housed in a desiccant case having flexibility, and
   the desiccant case is fixed by a fixing part at a location that is located below the suction port in a state of being wound around the suction pipe.

3. The accumulator according to claim 1, further comprising
   a suction pipe located in the tank and having the suction port, wherein
   the desiccant is filled in a desiccant case that is capable of keeping a specified shape, and the desiccant is fixed to the suction pipe at a location that is located below the suction port.

4. The accumulator according to claim 3, wherein
   the desiccant case has a press-fitting portion having a shape that fits to an outer peripheral surface of the suction pipe, and the suction pipe is press-fitted to the press-fitting portion of the desiccant case.

5. The accumulator according to claim 1, wherein
   the liquid phase refrigerant included in the refrigerant flowing to the tank drops downward along an inner wall of the tank from the location that is located above the desiccant to be stored in the lower portion in the tank.

6. The accumulator according to claim 5, further comprising
   a chuting member located on an upper side in the tank and below a refrigerant inlet of the tank, the chuting member guiding the refrigerant that flows into the tank to the inner wall of the tank, wherein
   the chuting member is arranged such that the refrigerant inflowing to the tank is separated into the liquid phase refrigerant and the vapor phase refrigerant after colliding with the chuting member and guided to an outer side of an outer periphery of the chuting member in a lateral direction of the tank, and
   the desiccant is located at an inner side of the outer periphery of the chuting member in the lateral direction of the tank.

7. The accumulator according to claim 6, wherein
   the suction port is located inside of the chuting member.

8. The accumulator according to claim 1, further comprising
   a suction pipe having an outer pipe and an inner pipe, the inner pipe is positioned inside of the outer pipe, wherein
   the outer pipe has a first end and a second end facing each other, and the first end provides the suction port.

9. The accumulator according to claim 8, wherein
   the second end of the outer pipe is sealed.

* * * * *